Sept. 20, 1966  E. C. THOMSON  3,274,580
RADIATION DETECTION DEVICE CIRCUITS FOR USE IN FLAME SENSING
Filed Aug. 10, 1962
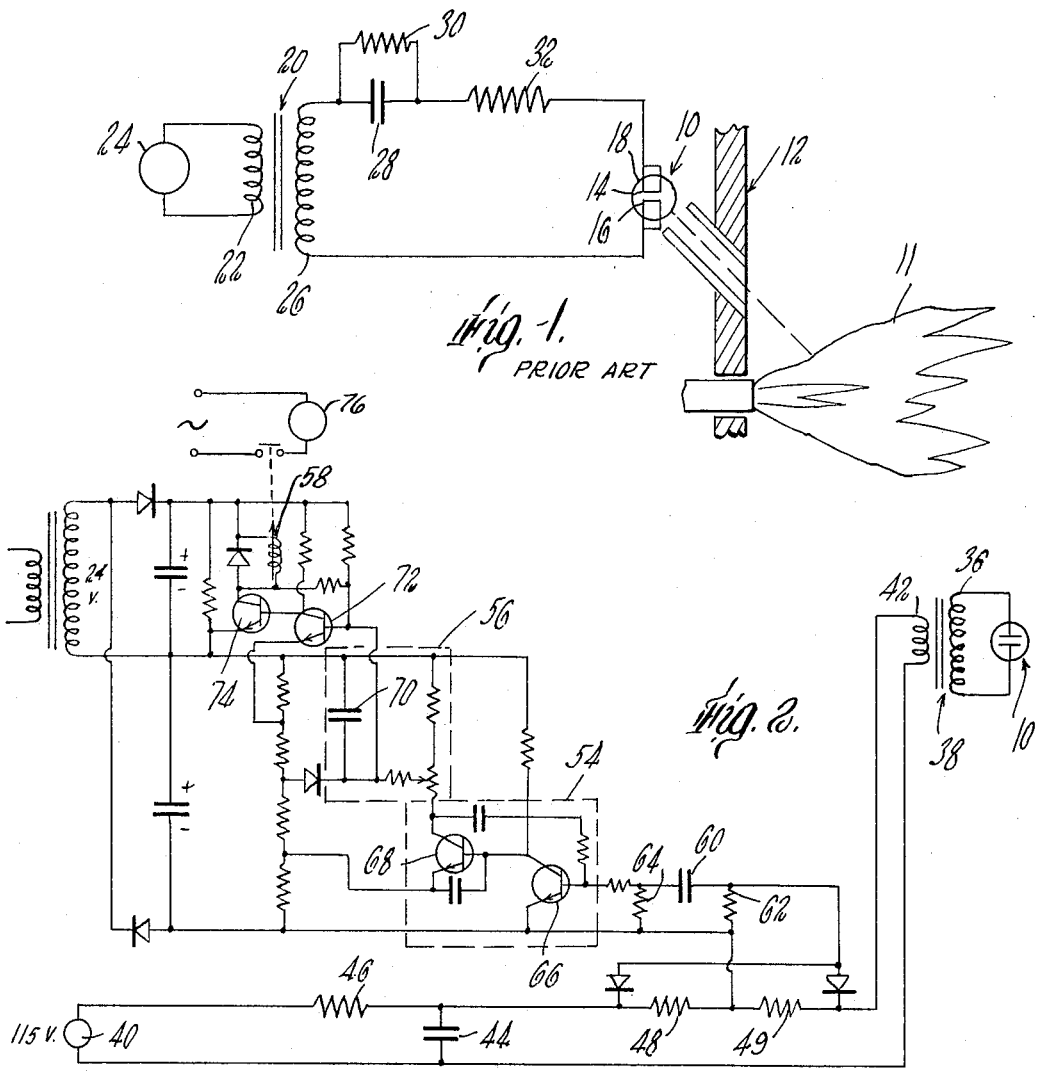
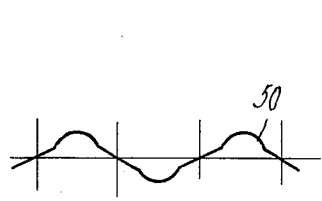
Fig. 3a
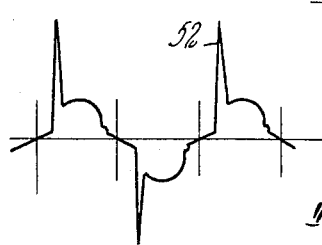
Fig. 3b
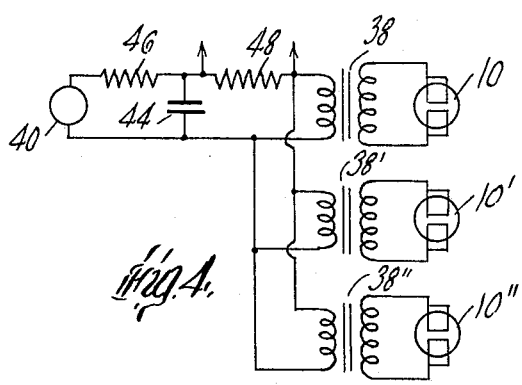
Fig. 4.

United States Patent Office 3,274,580
Patented Sept. 20, 1966

3,274,580
RADIATION DETECTION DEVICE CIRCUITS FOR USE IN FLAME SENSING
Elihu C. Thomson, Wellesley, Mass., assignor to Electronics Corporation of America, Cambridge, Mass., a corporation of Massachusetts
Filed Aug. 10, 1962, Ser. No. 216,121
8 Claims. (Cl. 340—228)

This invention relates to radiation detection devices and more particularly to circuitry for deriving pulse signals especially useful with ultraviolet radiation detection devices for employment in combustion supervision systems.

The supervision of combustion systems requires means to provide a positive indication of the presence or absence of a flame, and in some cases the ability to distinguish between a main combustion flame for example and a pilot flame. A variety of circuits have been devised for supervising combustion systems, many of them employing infra red radiation sensitive devices, as combustion flames emanate substantial quantities of infra-red radiation. However, certain types of combustion flames may be detected or discriminated more easily with an ultraviolet radiation sensor as the source of ultraviolet radiation of a flame is more localized than the infra-red radiation source. Also it is possible to distinguish a gas pilot flame from the main combustion flame fueled by coal as a gas flame produces substantially greater ultraviolet radiation.

The combustion chambers that are typically supervised operate at high temperatures and the flame detector component, which is optically coupled to the supervised flame area, is often located in an environment having an ambient temperature of 250° F. or above. Many electrical signal translating components become inoperative or must be very carefully designed in order to operate at such temperatures. This consideration is particularly important due to the mandatory reliability requirements of combustion supervision systems.

Accordingly, it is an object of this invention to provide an improved combustion control circuit which employs an ultraviolet radiation detector device in an arrangement whereby temperature sensitive electrical components may be located remotely from the supervised combustion chamber.

Another object of the invention is to provide novel and improved ultraviolet radiation sensing circuits of greater flexibility, versatility and reliability.

Another object of the invention is to provide novel and improved radiation detection circuitry in which the signal readout circuitry is inductively isolated from and may be located at a substantial physical distance from the radiation sensor.

Still another object of the invention is to provide improved radiation detector circuitry which enables the use of a plurality of radiation sensitive devices to be energized from a single signal source and which provides a simplified signal readout arrangement for the several radiation detectors.

In accordance with principles of the invention there is provided a radiation sensing system which employs a radiation detector which may be disposed to sense ultraviolet radiation from the flame in a supervised combustion system for example. The detector is isolated by a transformer from both the energizing source and the signal readout circuitry. In the preferred embodiment of the invention the detector employs two spaced elongated electrodes disposed parallel to one another between which there is built up by an alternating voltage source an electrostatic field of magnitude sufficient to produce ionization of the gas in the tube in avalanche breakdown manner between the electrodes when an electron is freed from one electrode in response to radiation impinging on that electrode. An iron core transformer, having a primary winding coupled to the voltage source and a secondary winding directly connected to the spaced electrodes, steps up the voltage of conventional alternating frequency (60 cycle) to approximately 700 volts to provide the energy to establish the electrostatic field. No electrical components are connected between the transformer secondary and the detection device. Connected across the primary winding is a storage capacitor which is charged from the A.C. voltage source through a current controlling resistor. This arrangement provides a capacitor discharge circuit through the primary winding that supplements the voltage source. A readout impedance is also connected in the capacitor discharge circuit. The current controlling resistor, connected in series with the source, controls the magnitude of the sustaining current flowing through the primary winding when the capacitor is discharged so that current in the detection device (as coupled through the transformer) is relatively small. Connected across the readout impedance is frequency selective means which responds to the relatively steep wavefront signal coupled back through the transformer when breakdown of the detector device occurs in response to the radiation of interest, but which blocks response to sine waves of the frequency of the energizing source. The invention enables several radiation detector devices to be connected in parallel across a single energizing source and readout circuit so that radiation detected by any one of the devices will produce a signal in the readout circuit. This arrangement has a particular advantage in a fire detection system where the detectors would be located in a high temperature environment as in aircraft engines, and a number of points may be supervised with the common readout circuitry. With a single detector or a plurality of detectors, the invention enables components which might be damaged or impaired by high temperature to be located remotely of the flame area. The invention provides reliable flame signal readout in a simple and inexpensive circuit.

Other objects, features and advantages of the invention will be seen as the following description of preferred embodiments thereof progresses, in conjunction with the drawings, in which:

FIG. 1 is a diagram illustrating a conventional circuit arrangement employed in ultraviolet radiation combustion control systems;

FIG. 2 is a schematic diagram of the combustion control system constructed in accordance with principles of the invention;

FIG. 3 is a series of wave forms indicating the response of the circuit of FIG. 2; and FIG. 4 is a diagram of the combustion detection circuitry employing a plurality of detectors and a common energizing source and readout circuit arrangement constructed in accordance with principles of the invention.

The radiation detection device employed in the preferred embodiment of the invention is a discharge tube 10 which is shown mounted in optically coupled relation to the flame 11 that is to be supervised in a combustion chamber 12. The tube has two electrodes 14, 16 mounted within an envelope 18 transparent to ultraviolet radiation. The two electrodes are mounted in symmetrical relation with their intermediate portions precisely parallel and accurately spaced from one another. The electrodes are high purity tungsten and a suitable atmosphere, preferably pure hydrogen, is disposed within the tube. When there is an electric potential across the tube electrodes in the order of 700 volts and ultraviolet radiation impinges on an electrode, one or more electrons are released from the tungsten surface and in an ionizing action breaks down the gas between the electrodes to produce a relatively low impedance so that a substantial electrical current flows between the electrodes through the low impedance. This current typically has an initial value of about 100 milliamperes which is almost immediately reduced by the circuit arrangement to a much smaller value which is sustained until the voltage across the electrodes drops to a value below which the discharge is not self-sustaining.

The conventional circuit for polarizing the electrodes of this type of discharge tube and generating a pulse signal upon ionizing breakdown in the tube is shown in FIG. 1. As the tube electrodes are symmetrical either may function as the cathode and an alternating current supply is employed. Transformer 20 has a 115-volt 60-cycle A.C. voltage applied to its primary winding 22 from source 24 and delivers about 700 volts at its secondary winding 26. Connected in series with the secondary winding is a capacitor 28 bridged by a resistor 30 and a current limiting resistor 32 which is connected to one of the electrodes of the tube. The other electrode is returned to the second terminal of the secondary winding to complete the circuit. Capacitor 28 has a much lower reactance than the electrode capacitance of the tube across the electrodes. When the tube breaks down into a self-sustained discharge in response to ionizing radiation the resulting current flow is determined by the difference between the voltage supplied at the transformer secondary winding and the circuit voltage drops across the tube 10, resistor 32 and the effective internal resistance of the transformer. An output signal is derived from this current flow, either at resistor 30 or with a suitable current sensitive device. This current continues to flow at a steadily decreasing rate until capacitor 28 is charged and subsequent flow is limited by resistors 30 and 32 in series. At some point in the half cycle as the voltage decreases the discharge will cease but capacitor 26 will be left charged to some voltage. During the next half cycle the capacitor will tend to discharge through resistor 30 connected in parallel with it but the portion of the capacitor charge remaining is of a polarity that adds to the secondary voltage during this half cycle so that the total voltage across the tube electrodes may be sufficiently high to produce hypersensitivity of the tube or even spontaneous breakdown.

Also in this circuit the output signal is derived from the high voltage side of transformer 20, thereby requiring another transformer device for isolation. As the output signal is brought out on high voltage leads it is desirable to position the isolation transformer close to the detector to minimize the length of the high voltage leads. Further, all the electrical components connected between the transformer secondary 26 and the detector tube 10 must have high voltage ratings and not be adversely affected by the high temperature environment of the detector tube adjacent the flame 11 in the combustion chamber 12 being supervised. The capacitor 28 is particularly critical as satisfactory high temperature high voltage capacitors are very expensive.

In the circuitry of the invention shown in FIG. 2 the tube 10 is connected directly across the secondary 36 of transformer 38 and all the electrical circuit components are connected between source 40 and the primary winding 42. Capacitance 44 is connected in parallel with primary winding 42 and is charged from source 40 through resistor 46. The capacitor is connected across the primary winding 42 of transformer 38 in series circuit with two output signal impedances 48, 49. The transformer 38, an iron core device, has a step up turns ratio of approximately seven to one and as indicated above the detector tube 10 is connected directly to the terminals of the secondary winding.

The magnetizing current supplied to transformer 38 produces a voltage in excess of 700 volts across the electrodes of the tube 10. When breakdown occurs in the tube 10 the capacitor 44 acts as a source of current in the primary winding loop independently of the voltage source 40. The current flowing through the primary winding 42 (and the readout impedances 48, 49) is determined by the difference between the instantaneous voltage across capacitor 44 and the voltage drops in the transformer secondary circuit as reflected in the primary circuit. The capacitor 44 continues to supply current to the primary winding until it is discharged to a voltage where the sustaining current is supplied by resistor 46. The value of that resistor is selected so that the residual tube current is substantially reduced from the initial surge.

Illustrative wave forms of this circuit response are shown in FIG. 3. In FIG. 3a is shown the current wave form 50 in the primary winding 42 of the transformer secondary 36, when there is no breakdown between the electrodes of tube 10. This "sine wave" is slightly distorted due to the magnetic circuit effect of the transformer 38. Upon breakdown, a pulse of current 52 is produced which is superimposed on the 60 cycle primary current as shown in FIG. 3b. It is a steep wave front current that rises to a magnitude about five times that of the peak magnetizing current in about one hundred microseconds and is sensed by the frequency sensitive circuitry connected across the two readout impedances 48, 49. (The two impedances are employed so that both positive and negative pulses may be sensed.)

The readout circuitry may include for example a pulse responsive circuit sensitive both to the shape and magnitude of this steep wave front pulse, followed by a monostable multivibrator 54, an integrating circuit 56 and a control relay 58 which operates in response to the energy accumulated by the integrating circuit. The circuit is unresponsive to 60 cycle sine wave transistions and only will respond to a signal of much steeper wave front.

As shown in FIG. 2, the current pulse is coupled through an input circuit including capacitor 60 and resistors 62, 64 which provide magnitude discrimination as well as steep wave front sensitivity. The pulse passed by the input circuit is applied to the base of normally conductive transistor 66 of the multivibrator circuitry to turn that transistor off so that action turns transistor 68 on for a duration controlled by the cross coupling circuitry and applies an output pulse to the integrating circuitry to charge capacitor 70. As capacitor 70 becomes charged, transistor 72 gradually becomes less conductive until it permits transistor 74 to conduct and energize relay 58. The pickup of the relay 58 provides an indication 76 of the presence of flame as sensed by the detector tube 10.

It will be noted that the surge current which flows in response to detector tube breakdown is supplied from capacitor 44 and independently of the A.C. power source 40 so that the source is not required to supply large peak currents. In addition, the resistance of the source 40 may be employed to control the magnitude of sustaining current and thus may form a portion of resistance 46. Further, there is no residual D.C. voltage on the capacitor which adds to the tube voltage on the half cycle following detector response. The circuitry is particularly advantageous as it requires only a transformer to be mounted in the vicinity of the detector in a hot environment and temperature sensitive components such as capacitors may be positioned in a remote, lower temperature environment for greater reliability in operation and less initial expense.

A further advantage of the circuit lies in the fact that the output pulse is derived from the change in transformer load resulting from detector tube breakdown as reflected to the primary side of the transformer. This permits a plurality of detector circuits to be inductively connected to a single signal readout in the arrangement shown in FIG. 4. In this arrangement an output signal is generated whenever any one of the detector tubes 10, 10', 10" breaks down. The transformers 38, 38', 38" are designed to have low magnetizing current characteristics so that use of several in parallel does not unduly load the drive circuit. The detector coupling leads are of low impedance to enable reasonably long runs without adverse effect for wiring capacitance. In this arrangement a multiple pick up ultraviolet fire detection system is possible in which transformers, wound for high temperature operation enable the detectors to be used in an elevated temperature environment, such as found in aircraft engines, for example.

Suitable values for the electronic components shown in FIG. 2 are as follows:

| Component | | Value |
|---|---|---|
| Resistor 46 | ohms | 750 |
| Resistor 48 | do | 10 |
| Resistor 49 | do | 10 |
| Resistor 62 | do | 100 |
| Resistor 64 | do | 470 |
| Capacitor 44 | microfarads | 2.0 |
| Capacitor 60 | do | 0.5 |
| Transformer 38: | | |
| Primary 42 | ohms | 46 |
| Secondary 36 | do | 1200 |

The iron core of transformer 38 is designed so that the primary magnetizing current is negligible compared with the peak primary current which flows as a result of discharge breakdown of tube 10, see FIG. 3b.

While preferred embodiments of the invention have been shown and described, modifications thereof will be obvious to those skilled in the art. Therefore, it is not intended that the invention be limited to the disclosed embodiments or to details thereof and departures may be made therefrom within the spirit and scope of the invention as defined in the claims.

I claim:

1. A flame sensing system comprising means for sensing radiation from a combustion flame including an envelope transparent to the flame radiation of interest,
a pair of electrodes mounted in spaced relation within said envelope,
a voltage step up transformer having a primary winding and a secondary winding inductively coupled together,
said secondary winding being connected in series with said electrodes,
alternating current supply means connected to energize said primary winding for inducing a high voltage signal in said secondary winding for application to said spaced electrodes to establish a high voltage electric field between said spaced electrodes,
a capacitance connected across said primary winding in circuit with said alternating current supply means for supplying a pulse of current in excess of that normally available from said supply means when said electric field breaks down,
a first resistance in circuit with said supply means for limiting the magnetizing current supplied to said primary winding by said alternating current supply means,
and readout circuitry including a second resistance connected between said alternating current supply means and said primary winding, means sensitive to the change in the current flow in said second resistance when the high voltage electric field between said spaced electrodes breaks down in avalanche discharge in response to flame radiation impinging on one of said eletcrodes,
and indicating means responsive to said current sensitive means for providing an indication of the presence of flame in the area being supervised.

2. A flame sensing system comprising means for sensing radiation from a combustion flame including an envelope transparent to the flame radiation of interest,
a pair of electrodes mounted in spaced relation within said envelope,
a voltage step up transformer having a primary winding and a secondary winding inductively coupled together on an iron core, said secondary winding being connected in series with said electrodes,
alternating current supply means connected to energize said primary winding for inducing a high voltage signal in said secondary winding for application to said spaced electrodes to establish a high voltage electric field between said spaced electrodes,
means including a capacitor connected across said alternating current supply means for supplying pulse current in excess of that obtainable from said alternating current supply means when the impedance of the circuitry connected to said secondary winding is sharply reduced due to avalanche breakdown of said high voltage electric field in response to the impingement of flame radiation on one of said electrodes,
a readout resistance connected in series circuit with said primary winding,
and signal responsive circuitry connected to said readout resistance including an input circuit having a series connected capacitance to pass input signals having rise time substantially in excess of the rise time of the signal from said alternating current supply means,
and flame indicating means responsive to signals passed by said input circuit for providing an indication of the flame condition as a function of changed current flow in said primary winding in response to repeated breakdown of the electric field between said spaced electrodes.

3. A flame sensing system comprising means for sensing radiation from a combustion flame including an envelope transparent to the flame radiation of interest,
a pair of symmetrical electrodes mounted in spaced relation within said envelope,
a voltage step up transformer having a primary winding and a secondary winding inductively coupled together on an iron core, said secondary winding being connected in series with said electrodes,
alternating current supply means connected to energize said primary winding for inducing a high voltage signal in said secondary winding for application to said spaced electrodes to establish a high voltage electric field between said spaced electrodes,
means including a capacitor connected across said alternating current supply means for supplying pulse current in excess of that obtainable from said alternating current supply means when the impedance of the circuitry connected to said secondary winding is sharply reduced due to avalanche breakdown of said high voltage electric field in response to the impingement of flame radiation on one of said electrodes,
two readout resistances connected in series circuit with said primary winding with a junction defined between said resistances,
a common reference line connected to said junction an asymmetrically conductive device connected at the other end of each said readout resistance, said asymmetrically conductive devices being coupled together to a common signal line,
said signal responsive circuitry connected to said common reference and signal lines including an input circuit having a series connected capacitance to pass input signals having rise time substantially in excess of the rise time of the signal from said alternating current supply means,
pulse shaping means connected to said input circuit responsive to signals passed by said series connected capacitance,
pulse integrating means for storing an indication of a series of pulses provided by said pulse shaping means,
and flame indicating means connected to said integrating means for providing an indication of the flame condition as a function of changed current flow in said primary winding in response to repeated breakdown of the electric field between said spaced electrodes.

4. Condition sensing apparatus comprising
a condition senser having a pair of electrodes mounted in spaced relation,
a voltage step up transformer having a primary winding and a secondary winding inductively coupled together,
said secondary winding being connected in series with said electrodes,
alternating current supply means connected to energize said primary winding for inducing a high voltage signal in said secondary winding for application to said spaced electrodes to establish a high voltage electric field between said spaced electrodes,
a capacitance connected across said primary winding in circuit with said alternating current supply means for supplying a pulse of current in excess of that normally available from said supply means when said electric field breaks down,
a first resistance in circuit with said supply means for limiting the mangetizing current supplied to said primary winding by said alternating current supply means,
and readout circuitry including a second resistance connected between said alternating current supply means and said primary winding and means sensitive to the change in the current flow in said second resistance when the high voltage electric field between said spaced electrodes breaks down in avalanche discharge in response to radiation from the conditions being sensed impinging on one of said electrodes.

5. In combination, a radiation sensing device having two spaced electrodes and operable to discharge upon sensing radiation,
a transformer having a primary winding and a secondary winding,
said secondary winding being coupled in series with said electrodes,
current supply means connected to energize said primary winding,
capacitive current booster means connected across said primary winding for supplying pulse current to said primary winding in excess of that normally available from said current power supply means when said radiation sensing device operates in response to sensed radiation,
and readout circuitry including an impedance connected in series with said current supply and said booster means for producing a signal indicative of sensed radiation in response to current supplied to said primary winding by said current supply and said booster means.

6. In combination, a radiation detection device having an envelope transparent to the radiation of interest,
a pair of spaced electrodes mounted within said envelope,
a voltage step up transformer having primary and secondary windings inductively coupled together,
said secondary winding being connected in series with said electrodes,
means to supply magnetizing current to said primary winding through a current controlling resistance to produce a high voltage electric field between said electrodes,
a circuit including a capacitor connected to said primary winding for augmenting said magnetizing current supply means when said radiation sensing device breaks down in discharge action upon the sensing of radiation of interest,
a readout impedance connected in circuit with said primary winding,
and means coupled to said readout impedance for providing a signal indicative of the sensing of radiation of interest.

7. In combination a radiation detection device having an envelope transparent to the radiation of interest,
a pair of symmetrical spaced electrodes mounted within said envelope,
a voltage step up transformer having primary and secondary windings inductively coupled together on an iron core,
said secondary winding being connected in series with said electrodes,
means to supply magnetizing current to said primary winding to produce a high voltage on said secondary winding and an electric field between said electrodes,
a circuit including a capacitor connected across said magnetizing current supply means for supplying pulse current in excess of that obtained from said magnetizing current supply means when said radiation sensing device breaks down in discharge action upon the sensing of radiation of interest,
a readout impedance connected in circuit with said primary winding,
and means coupled to said readout impedance for providing a signal indicative of the sensing of radiation of interest.

8. A flame sensing system comprising a plurality of flame sensers, each said senser including an envelope transparent to the flame radiation of interest,
and a pair of symmetrical electrodes mounted in spaced relation within said envelope,
a voltage step up transformer associated with each said senser, each said transformer having a primary winding and a secondary winding inductively coupled together on an iron core,
said primary windings being connected together in parallel and each said secondary winding being connected in series with said electrodes of the associated flame senser,
alternating current supply means connected to energize said primary windings for inducing a high voltage signal in said secondary windings for application to said spaced electrodes of each said flame senser to establish a high voltage electric field between each pair of spaced electrodes,
a capacitor connected across said alternating current supply means for supplying pulse current in excess of that obtainable from said alternating current supply means when the impedance of the senser connected to any one of said secondary windings is sharply reduced due to avalanche breakdown of said high voltage electric field in response to the impingement of flame radiation on one of said electrodes,
a readout resistance connected in series circuit with the parallel combination of said primary windings,
and current responsive circuitry including a capacitance input circuit connected to said readout resistance to pass signals having rise times substantially in excess of the rise time of the signal from said alternating current supply means,
pulse shaping means connected to said input circuit,
pulse integrating means for storing an indication of a series of pulses provided by said pulse shaping means,
and flame indicating means connected to said integrating means for providing an indication of the flame condition as a function of changed current flow through said readout resistance in response to repeated breakdown of the electric field between a pair of said spaced electrodes.

References Cited by the Examiner

UNITED STATES PATENTS 3,142,758   7/1964   Dietz.

NEIL C. READ, *Primary Examiner.*

RALPH G. NILSON, *Examiner.*

R. M. ANGUS, A. R. BORCHELT, D. YUSKO,
*Assistant Examiners.*